(12) United States Patent
Lee

(10) Patent No.: US 10,922,512 B2
(45) Date of Patent: Feb. 16, 2021

(54) CONTACTLESS FINGERPRINT RECOGNITION METHOD USING SMARTPHONE

(71) Applicant: WINNINGI CO., LTD., Seoul (KR)

(72) Inventor: Sang Hoon Lee, Gwangmyeong-si (KR)

(73) Assignee: WINNINGI CO., LTD., Seoul (KR)

( * ) Notice: Subject to any disclaimer, the term of this patent is extended or adjusted under 35 U.S.C. 154(b) by 0 days.

(21) Appl. No.: 15/560,041

(22) PCT Filed: Mar. 15, 2016

(86) PCT No.: PCT/KR2016/002580
§ 371 (c)(1),
(2) Date: Sep. 20, 2017

(87) PCT Pub. No.: WO2016/153209
PCT Pub. Date: Sep. 29, 2016

(65) Prior Publication Data
US 2018/0075277 A1 Mar. 15, 2018

(30) Foreign Application Priority Data
Mar. 20, 2015 (KR) .................. 10-2015-0038929

(51) Int. Cl.
*G06K 9/00* (2006.01)
*G06T 7/73* (2017.01)
(Continued)

(52) U.S. Cl.
CPC ..... *G06K 9/00013* (2013.01); *G06K 9/00033* (2013.01); *G06K 9/00912* (2013.01);
(Continued)

(58) Field of Classification Search
CPC ............ G06K 9/00013; G06K 9/3275; G06K 9/3208; G06K 9/00033; G06T 7/90; G06T 7/73; G06T 1/0007; G06T 5/006
See application file for complete search history.

(56) References Cited

U.S. PATENT DOCUMENTS

2006/0113381 A1* 6/2006 Hochstein .......... G06K 19/0718
235/382
2011/0155801 A1* 6/2011 Rowberry ............ G06Q 20/341
235/379
(Continued)

FOREIGN PATENT DOCUMENTS

KR 10-2003-0044873 A 6/2003
KR 10-2006-0034064 A 4/2006
(Continued)

*Primary Examiner* — Samir A Ahmed
(74) *Attorney, Agent, or Firm* — Novick, Kim & Lee, PLLC; Jae Yoon Kim

(57) ABSTRACT

The present invention relates to a contactless fingerprint recognition method using a smartphone and, more particularly, to a contactless fingerprint recognition method using a smartphone, which can generate an optimal fingerprint image without distortion regardless of various standards of built-in camera lenses of smartphones, has compatibility with a fingerprint image of a conventional optical fingerprint recognition device that has been widely popularized, and enables the fingerprint image to be converted into an image that meets the requirements of the international standard (ISO19794-4) and into optimal recognized fingerprint data (ISO19794-2), so that the utilization of contactless fingerprint recognition is further improved.

5 Claims, 4 Drawing Sheets

(51) Int. Cl.
  *G06T 7/90*  (2017.01)
  *G06T 1/00*  (2006.01)
  *G06T 5/00*  (2006.01)
  *G06K 9/32*  (2006.01)

(52) U.S. Cl.
  CPC .......... *G06K 9/3275* (2013.01); *G06T 1/0007* (2013.01); *G06T 5/006* (2013.01); *G06T 7/73* (2017.01); *G06T 7/90* (2017.01)

(56) References Cited

U.S. PATENT DOCUMENTS

| | | | |
|---|---|---|---|
| 2012/0051629 A1 | 3/2012 | Ueki et al. | |
| 2012/0075442 A1* | 3/2012 | Vujic | G07C 9/00087 348/61 |
| 2014/0044322 A1* | 2/2014 | Kumar | G06K 9/00087 382/124 |
| 2014/0062658 A1* | 3/2014 | Vrijen | G06Q 20/32 340/5.83 |
| 2014/0310804 A1* | 10/2014 | Apostolos | H04L 63/0861 726/19 |
| 2016/0210493 A1* | 7/2016 | Walch | G06K 9/00013 |

FOREIGN PATENT DOCUMENTS

| | | |
|---|---|---|
| KR | 10-2015-0003501 A | 1/2015 |
| KR | 10-2015-0007403 A | 1/2015 |

* cited by examiner

CONTACTLESS FINGERPRINT RECOGNITION METHOD USING SMARTPHONE

TECHNICAL FIELD

The present invention relates to a contactless fingerprint recognition method using a smartphone and, more particularly, to a contactless fingerprint recognition method using a smartphone, which can generate an optimal fingerprint image without distortion regardless of various standards of built-in camera lenses of smartphones, has compatibility with a fingerprint image of a conventional optical fingerprint recognition device that has been widely popularized, and enables the fingerprint image to be converted into an image that meets the requirements of the international standard (ISO19794-4) and into optimal recognized fingerprint data (ISO19794-2), so that the utilization of contactless fingerprint recognition is further improved.

BACKGROUND ART

Biometrics is a user authentication technology that identifies a user based on human body characteristics or behavioral characteristics, and a biometrics forum in Korea defines biometrics as a personal authentication technology based on observation of 'behavioral, biological (anatomical, physiological) characteristics.

A method for recognizing information on the physical characteristics of a human being used in the biometric technology includes Fingerprint, Iris-scan, Retina-scan, Hand geo-metry, and Facial recognition methods, and a method for recognizing information on behavioral characteristics includes voice recognition, signature-scan, and gait recognition methods.

Fingerprint recognition is the most utilized and widely used in the biometric technology, and the fingerprints formed on human fingers are all different and also are different from one person to another and have characteristics that do not change forever as they were when born, so that reliability and stability of identification are high, and storage and verification of information is easy.

Conventionally, a fingerprint verification device for fingerprint recognition has a glass surface (sensor) formed on the top and includes a camera and a light built therein, and when the fingerprint verification device operates, the camera is formed to obtain a fingerprint image by photographing a finger.

Also, the fingerprint verification device is provided with a function (Live Finger Detection, LFD) for determining whether it is an imitation fingerprint made from silicon or the like, not the actual human body fingerprint and a function for extracting and storing feature points of fingerprint ridges (Optimal fingerprint data generation function, Image Enhancement Feature Extraction Matching), and so on.

The fingerprint verification device is called an optical (or touch) fingerprint verification device, which obtains a clean, flat fingerprint image by adjusting the sharpness and contrast of the fingerprint image photographed by the optical fingerprint verification device.

At this time, the obtained fingerprint image is stored in accordance with a fingerprint image standard having a resolution of 500 dpi in order to receive an authentication guaranteeing the image quality (for example, PIV authentication issued by the FBI in USA, etc.).

Further, the fingerprint image extracts feature points (position and orientation) of the ridges of the respective fingerprints, such as a broken portion and a cracked portion of the fingerprint.

Since fingerprints can be distinguished only by the extracted feature points, in order to solve the problem of storage capacity limitation and for quick handling due to fast contrast between fingerprints, they are stored as optimal recognition fingerprint data (template, data in which personal unique biometric characteristic information is recorded) that extracts only such feature points.

The optimal recognition fingerprint data is stored through a method defined by an international standard (ISO19794-2/ANSI378) (hereinafter referred to as 'international standard') for compatibility between different products.

However, the conventional optical fingerprint verification device has problems in that there is a sense of rejection because a user must directly touch the finger to the sensor, the shape of the fingerprint can be distorted depending on the intensity of the pressure applied to the glass surface (sensor), the shape of the fingerprint can be distorted because the finger slides on the contact surface of the glass surface (sensor), and a clear fingerprint image cannot be obtained because of the difference between ambient temperature and humidity or the skin condition of a user (e.g., the degree of drying and wetting of the skin).

In order to solve the problem of the conventional optical fingerprint verification device, in recent years, a contactless fingerprint verification device has been developed to obtain a fingerprint image at a position slightly away from a camera while a user does not directly touch a glass surface (sensor).

A conventional contactless fingerprint verification device and a technique relating to a fingerprint recognition method are disclosed in Korean Patent Publication Nos. 0895247, 0604267, and 1274260.

DISCLOSURE OF THE INVENTION

Technical Problem

However, the conventional contactless fingerprint verification device and fingerprint recognition method have the following problems, and in recent years, due to popularization of smartphones and the development of the technology, development of a fingerprint recognition method using cameras and lights built in a smartphone has been attempted, but this also has the following problems.

(1) In relation to a contactless fingerprint verification device and a contactless fingerprint recognition method that recognizes the fingerprint after photographing a finger with a camera and light built in a smartphone, the interval between the camera and the subject's fingers changes with each shot, and also, since the finger, i.e., a subject, cannot be positioned to be horizontal with the camera, due to problems such as fingers being rotated or hand tremors each shot, clear and accurate fingerprint images cannot be obtained.

(3) Since the types of smartphone are very diverse and the specifications of the camera lens mounted on each smartphone are different, the uniformity of the fingerprint image is not guaranteed.

(3) By the perspective that is produced when the subject's finger is photographed by the camera, distortion occurs in the outer area of the fingerprint area to be recognized, so that the recognition area becomes narrow.

(4) The fingerprint image photographed by the camera and the light of the smartphone cannot support the compatibility and the standardization in the resolution, etc., so that the fingerprint image can only be used for authentication of the personal terminal for security of the smartphone of the user.

In order to solve the above problems, the present invention provides a contactless fingerprint recognition method using a smartphone.

Technical Solution

In order to achieve the above object, in an environment allowing a finger, i.e., a subject, to be photographed with a smartphone having a built-in camera and light, the present invention includes, a lookup table generation step of calculating a correlation between a photographing pattern image obtained by photographing a standard pattern provided in advance and a standard pattern image pre-built in the smartphone and calculating a mapping relation of a pixel unit between the two images to generate a Look Up Table (LTU), a photographing step of suggesting the finger guide on the screen and generating a finger image, i.e., a subject, with the camera and the light built in the smartphone, a correction step of generating a standard finger image by correcting a size and a position of a finger image photographed in a state the finger image is out of a range of the finger guide or rotated and correcting a distortion of a camera lens through the lookup table, and a fingerprint image acquisition step of obtaining a finger image of a fingerprint area from the finger image corrected in the correction step.

The lookup table generation step is executed only once or a desired number of times at the time of a user's first use.

The correction step includes a standard conversion step of converting the finger image into a standard resolution of 500 dpi which is an international standard.

The correction step includes a mirroring conversion step of converting the finger image symmetrically in a vertical direction.

The correcting step includes an image reversing step of reversing the color of the finger image, that is, reversing the color to allow the ridge to be darker than the background image.

After the correction step, a perspective correction step may be included to warp the standard finger image of the correction step into a planar pattern in consideration of the perspective.

A recognition fingerprint data generation step of extracting the feature points of the ridge of the fingerprint from the image of the recognized fingerprint area to generate biometric data and generating optimal recognition fingerprint data is further included after the fingerprint image acquisition step.

The fingerprint image acquisition step further includes a quality examination step of examining the quality through a sampling method using the sharpness of the density of the ridge of the obtained fingerprint image.

The photographing step includes an actual fingerprint recognition step (Live Finger Detection, LFD) function of checking whether it is an actual human fingerprint by determining the colors or connectivity of the finger image appearing on the screen.

Each of the above steps is provided as an application program of the smartphone and is provided in a form stored in a compact disk or a physical storage medium.

Advantageous Effects

According to the contactless fingerprint recognition method using the smartphone of the present invention, the following effects occur.

(1) Since the finger guide is provided on the screen of the smartphone and a user photographs the finger in the finger guide range as much as possible, the distance between the camera and the subject's fingers is kept constant at each photographing, and the subject's fingers can be positioned to be substantially horizontal with the camera, so that problems occurring at the time of photographing are solved, and a clearer and more accurate finger image can be obtained by the correction step.

In addition, since the lookup table has no distortion according to the standard of the camera lens, the resolution of the fingerprint image can be easily changed, and it is possible to correct the perspective of the photographed finger image by the perspective correction step and convert it into a two-dimensional plane, so that it is compatible with conventional fingerprint images already stored by an optical fingerprint verification device.

(2) Even if a variety of smartphones are used, if the image is converted in the correction step using the lookup table created in the lookup table generation step, the distortion due to the camera lens can be corrected, thereby ensuring the uniformity of the fingerprint image.

(3) The finger image, which is photographed by the smartphone in a state where the interval is not constant or is rotated, is resolved by the correction step, and in the perspective correction step, the distortion due to the perspective generated in the outer area of the fingerprint image is corrected.

(4) In addition, through the standard conversion step of converting the photographed fingerprint image into the standard resolution and the recognition fingerprint data generation step, it can be perfectly compatible with the fingerprint DB which is conventionally obtained and stored, and also there is an effect that the use area of the fingerprint image can be further widened.

That is, when each police officer arrests the criminal or finds the missing person, if the police photographs the fingerprint of the criminal or the missing person using his/her smartphone in the field, and sends it to the database (DB) of the police agency, the identification can be verified immediately, and since the parents of a child can photograph a fingerprint of the child at home and register it with the government office in advance, when a child is missing, he/she can be easily found through fingerprint matching, so that it is also effective in preventing a child missing incident, and since you can transfer optimal recognition fingerprint data using your smartphone in Internet banking and e-commerce, it can be utilized as a means of authentication of the himself/herself, and the security of the transaction can be further enhanced, so that the utilization area becomes very wide.

MODE FOR CARRYING OUT THE INVENTION

Figure 1:
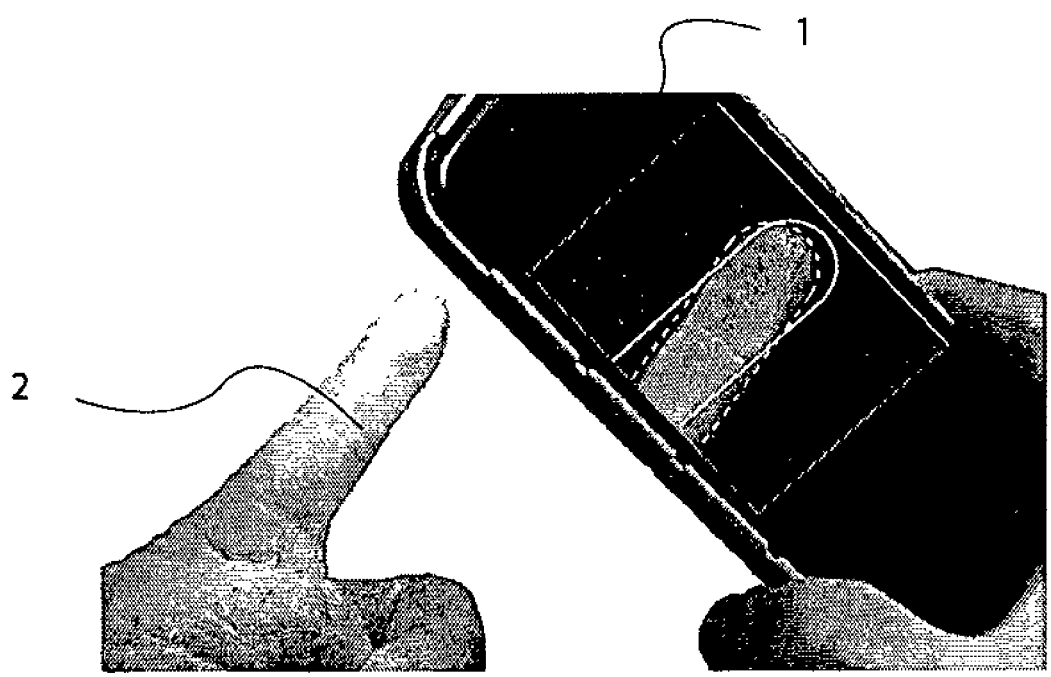
FIG. 1 is a conceptual diagram showing an environment applied to a contactless fingerprint recognition method using a smartphone formed according to a preferred embodiment of the present invention.
Figure 2:
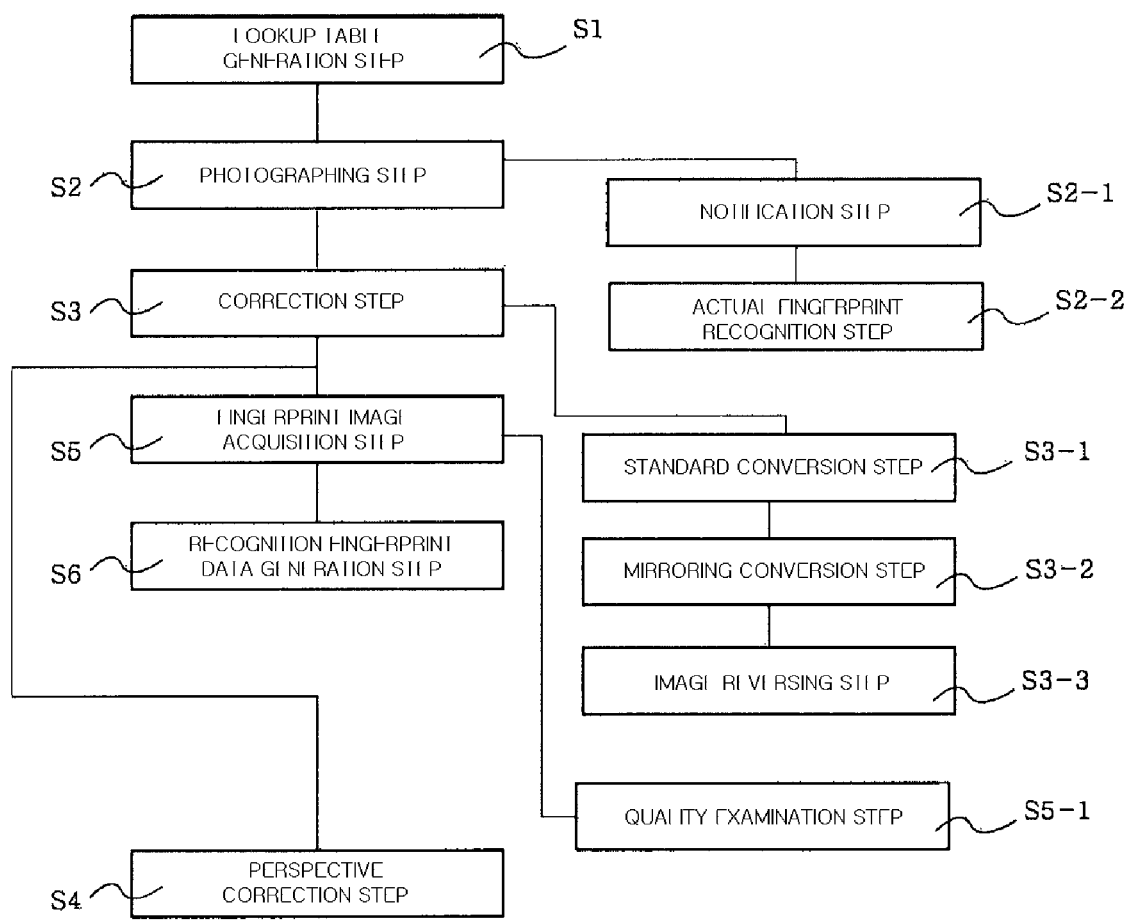
FIG. 2 is a conceptual flowchart of a contactless fingerprint recognition method using a smartphone formed according to a preferred embodiment of the present invention.
Figure 3:
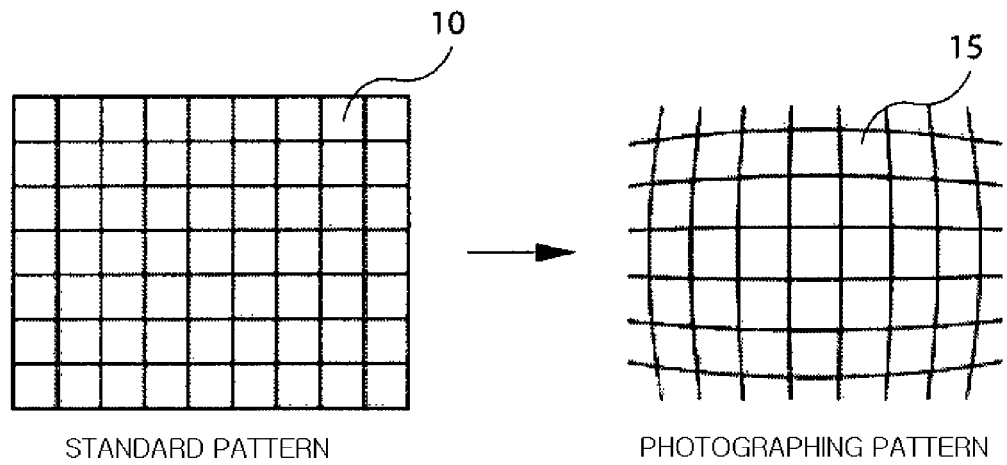
FIG. 3 is a conceptual diagram illustrating an example of a standard pattern and a distortion pattern used in a lookup table generation step of a contactless fingerprint recognition method using a smartphone formed according to a preferred embodiment of the present invention.

The terms used in this specification mean the following.

A 'Finger image' refers to an image of a finger being photographed to obtain a fingerprint, A 'Fingerprint image' refers to the final image that recognizes the ridges of the fingerprint area in the finger image, An 'optimal recognition fingerprint data' refers to data obtained by extracting feature points of ridges of a corresponding fingerprint image and converting it to the international standard.

In order to achieve the above-mentioned object, in an environment where a smartphone formed with a camera and a light photographs a subject's finger, the present invention includes, a lookup table generation step (S1) for generating a lookup table by calculating a correlation between an image of a photographing pattern 15 obtained by photographing a standard pattern 10 provided in advance and an image of the standard pattern 10 pre-built in a smartphone and calculating a mapping relation of a pixel unit between the two images, a photographing step (S2) of presenting a finger guide 30 on a screen, photographing a finger with the camera and the light built in the smartphone to generate a finger image, a correction step (S3) of correcting the size and position of the finger image 25 photographed in a state where it is out of the range of the finger guide 30 or rotated to within the range of the finger guide 30 to create a standard finger image and correcting the distortion of the camera lens using a lookup table, and a fingerprint image acquisition step (S5) of obtaining a fingerprint image of a fingerprint area A from the finger image 25 corrected in the correcting step (S3).

The lookup table generation step (S1) is a step of calculating a distortion according to the camera lens in advance to generate a lookup table by mapping a correlation between pixels of the image of the already known standard pattern 10 (a correlation between each pixel of the standard pattern 10 provided in the form of a print is data already built in the program of the smartphone) and a correlation between pixels of the image of the photographing pattern 15 obtained by the photographing of the user's smartphone camera.

Accordingly, the lookup table generation step (S1) may generate and store a lookup table once when the present invention is implemented for the first time, or may generate and store a lookup table again when a user desires.

The standard pattern 10 may be provided in the form of a printed matter to a user or may be provided in a form in which the standard pattern 10 is provided on the web and is usable.

The finger guide 30 of the photographing step (S2) is formed in a reversed 'U' shape and is displayed on a screen provided by the camera of the smartphone 1 to view the photographed image in real time and is provided to allow a user to align the finger 2 within the range of the finger guide 30.

In the photographing step (S2), the light, that is, the flash, must be turned on and this allows the background to become dark and only the finger, i.e., a subject, to be photographed brightly, so that the ridge of the fingerprint can be clearly revealed.

As described above, since the user aligns the finger 2, i.e., a subject, with the finger guide 30, the distance between the camera and the finger, i.e., a subject, is adjusted, so that the photographing position and the interval can be maintained relatively accurately.

However, since the user has to hold and align the smartphone and the finger 2, i.e., a subject without a guide, it is difficult to accurately align the finger 2 within the range of the finger guide 30, so that a notification step (S2-1) can be performed to output a sound or image indicating that the finger 2 can be photographed when the finger 2 is positioned within a range of the finger guide 30 to some extent. The photographing can be automatically taken after the notification step (S2-1) is performed.

The correcting step (S3) is step of correcting the photographed finger image 25 to fit the finger guide 30 with the finger 2, i.e., a subject, not being accurately positioned within the range of the finger guide 30 and generating a standard finger image 25 after correcting the camera distortion using the lookup table.

Figure 4:
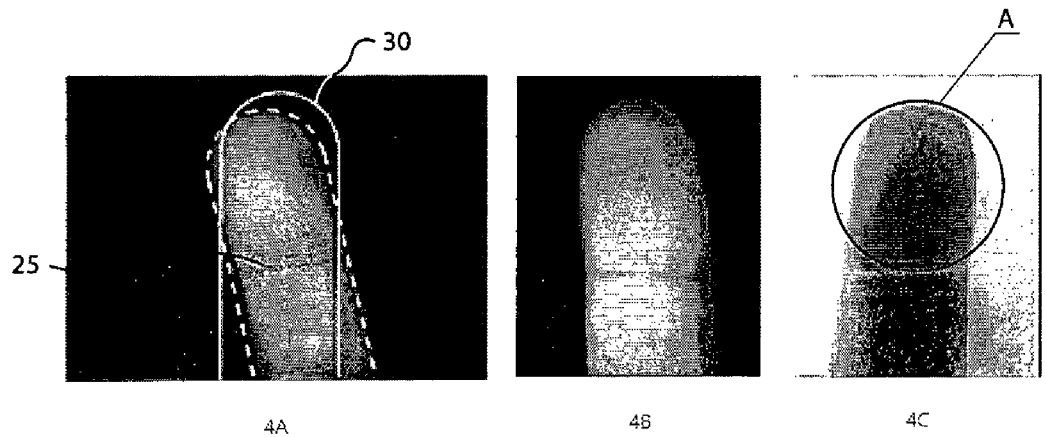
FIG. 4 is a conceptual diagram illustrating an example of obtaining a finger image used in a photographing step of a contactless fingerprint recognition method using a smartphone formed according to a preferred embodiment of the present invention.

FIG. 4A shows the finger image 25 to be photographed in real time and FIG. 4B shows the finger image 25 corrected after photographing, and as shown in the shape (see FIG. 4) in the dotted line at the time of photographing, even if the finger shape cannot be photographed with the finger image 25 within the range of the finger guide 30, it is corrected to within the range of the finger guide 30 in the correction step (S3), so that the finger image 25 is corrected as a result (the finger image 25 of FIG. 4B).

When the finger image 25 is stored in the correction step (S3), the distortion of the camera lens is corrected in advance using a lookup table.

A method of correcting the finger image 25 to the position of the finger guide 30 includes image tracking, image reduction, enlargement, and rotation functions using contrast.

The correction step (S3) includes a standard conversion step (S3-1) of converting the finger image 25 into a standard resolution of 500 dpi which is an international standard, and this is possible by correcting the distortion of the camera lens by a lookup table.

The correction step (S3) includes a mirroring conversion step (S3-2) of converting the finger image 25 into a vertical direction, that is, a left-right symmetry.

That is, the mirroring conversion step (S3-2) is a step of flipping the left and right sides of the fingerprint image photographed by the camera of the smartphone for compatibility with the optical fingerprint scanner.

Since the subject photographed by the camera is photographed in a state where the left and right sides are reversed, the mirroring conversion step (S3-2) is a step of converting it into a left-right symmetry to recognize the actual finger image 25.

The correction step (S3) includes an image reversing step (S3-3) of reversing the hue of the finger image 25.

The ridge of the fingerprint of the finger image 25 photographed in the photographing step (S2) appears bright (white), and since the ridge is stored in a dark state (black)

in the stored conventional fingerprint image, the image reversing step (S3-3) is the same as the step of storing the conventional fingerprint image stored through color reversal.

The fingerprint image acquisition step (S5) is a step of obtaining a fingerprint image of the fingerprint area A from the finger image 25 corrected in the correction step (S3), and the fingerprint image is stored as it is and kept.

After the fingerprint image acquisition step (S5), a recognition fingerprint data generation step (S6) of extracting feature points of each ridge formed in the image of the fingerprint area A from the recognized fingerprint image to generate biometric data and converting it into optimal recognition fingerprint data may be further performed.

The feature points of the recognition fingerprint data generation step (S6) refers to points for storing the direction and the position of a point obtained by finding a point where a ridge is divided, a point where a ridge ends and begins and so on, and this is made with the same international standard.

Generally, the number of feature points appearing in one fingerprint area A is about 40 to 120 according to the image quality, and when two fingerprint images are visually verified, if 7 to 10 matches are found, this is regarded as a user himself/herself, and in the automatic matching system using the fingerprint recognition algorithm, 12 to 15 or more are used as a user verification criteria according to the security level.

The fingerprint image acquisition step (S5) further includes a quality examination step (S5-1) of sampling the sharpness and the density of ridges of the obtained fingerprint image by a certain fraction and examining the quality thereof.

After the correction step (S3), a perspective correction step (S4) may be performed to warp into a planar pattern in consideration of the perspective of the standard finger image.

Figure 5:
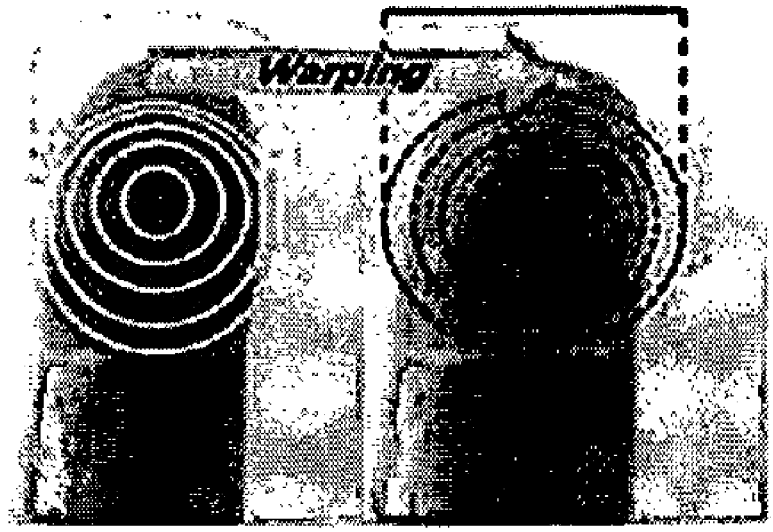
FIG. 5 is a view illustrating an example of correcting the perspective of a perspective correction step of a contactless fingerprint recognition method using a smartphone formed according to a preferred embodiment of the present invention.
Figure 6:
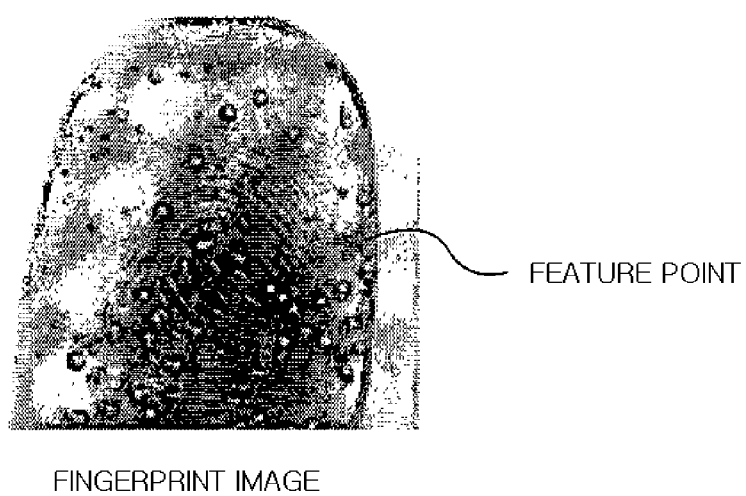
FIG. 6 is a fingerprint image drawing showing the optimal fingerprint image data of a contactless fingerprint recognition method using a smartphone formed according to a preferred embodiment of the present invention.

The perspective correction step (S4) is a step of making the interval between ridges constant by applying image warping technology to a perspective (a phenomenon in which an interval between ridges becomes narrower as it goes from the center to the outer edge) in which an interval between ridges recognizable in the finger image 25 photographed by the camera is not constant as shown in FIG. 5.

The image warping technique, as a technique of deforming an image, is a technique of moving points at a predetermined position associatively to create a new type of image.

The present invention applies a technique of deforming the intervals and positions between ridges to allow their intervals to be constant through an image warping technique.

The photographing step (S2) includes an actual fingerprint recognition step (Live Finger Detection, LFD S2-2) function of checking whether it is an actual human fingerprint by determining whether all the colors of the finger image 25 appearing on the screen are all matched or are connected (connectivity).

The fingerprint acquisition step (S5) further includes a quality examination step (S5-1) of determining each zone using the sharpness and the density of ridges of the obtained fingerprint image, sampling this, and examining the quality thereof.

Each of the above steps can be provided as an application program of a smartphone and is provided in a form stored in a compact disk or a physical storage medium.

In addition, corresponding organizations such as banks and police agencies can distribute these application programs free of charge and utilize them in various ways.

In relation to the recognition fingerprint data, when the fingerprint image is converted into an international standard 500 dpi image in the international standard conversion step (S4-1) of the perspective correction step (S4) and the feature points are extracted in the recognition fingerprint data generation step (S6), the optimal recognition fingerprint data is generated which is compatible with existing fingerprint data recognized and stored by a conventional optical fingerprint verification device.

Since the fingerprint image created by the present invention or the optimal recognition fingerprint data is compatible with the conventional fingerprint DB obtained by the optical fingerprint verification device, this can be used in various ways such as finding a lost child, arresting a criminal, and authenticating a person, etc., in comparison to the fingerprint DB stored in the government administration or the police department of the government of the Republic of Korea.

Especially, since a person who carries a smartphone can authenticate himself/herself in real time anytime and anywhere, there is an effect that it can be utilized for tasks such as electronic commerce on the Internet, financial settlement, and document view and copy of government offices.

Also, when each police officer arrests a criminal or finds a missing person, after the fingerprint of the criminal or the missing person is photographed by a smartphone carried by a police officer in real time, it is possible to instantly confirm the identity by transmitting the fingerprint to a fingerprint database stored in the police department, Since the parents of a child can photograph the fingerprint of the child and register it to a government office in advance at home, it is effective to prevent a missing child because a child can be easily found by fingerprint matching when the child is lost, and since a user can transmit optimal recognition fingerprint data using his/her smartphone during Internet banking and transactions on the Internet, it is possible to utilize it as a means of self-certification, so that the utilization range thereof becomes very wide such as increasing the security of the financial transaction.

While the present invention is described based the preferred embodiments with reference to the accompanying drawing, it will be apparent to those skilled in the art that various modifications may be made without departing from the scope of the present invention encompassed by the appended claims.

What is claimed is:

1. A contactless fingerprint recognition method using a smartphone configured to generate a finger guide on a screen thereof and to obtain a fingerprint of a finger by positioning the finger to the finger guide through a camera built-in the smartphone, the method comprising:

a lookup table generation step of calculating a correlation between a photographing pattern image obtained by photographing a standard pattern provided in advance by an execution of a smartphone application and a standard pattern image pre-built in the smartphone and calculating a mapping relation of a pixel unit between the photographing pattern and standard pattern images to generate a Look Up Table (LTU);

a photographing step of suggesting the finger guide on the screen and generating a finger image using the camera built-in the smartphone;

a correction step of generating a standard finger image by correcting a size and a position of the finger image photographed in a state the finger image is out of a range of the finger guide and correcting a distortion of a camera lens through the lookup table;

a fingerprint image acquisition step of obtaining a fingerprint image of a fingerprint area from the standard finger image generated in the correction step; and a recognition fingerprint data generation step of extracting feature points of at least one ridge formed in the fingerprint image to generate biometric data and converting the biometric data into optimal recognition fingerprint data after the fingerprint image acquisition step.

2. The method of claim 1, wherein the correction step further comprises a standard conversion step of converting the finger image into a standard resolution of 500 dpi.

3. The method of claim 1, wherein the finger guide of the photographing step is formed in a reversed 'U' shape, and is displayed on the screen to allow the camera of the smartphone to view the finger in real time, and the method further comprises a notification step of providing a notification when a user matches the finger to the finger guide.

4. The method of claim 1, wherein the correction step further comprises a mirroring conversion step for reversing left and right to be compatible with an optical fingerprint scanner and an image conversion step of changing the at least one ridge into black color.

5. The method of claim 1, wherein the photographing step further comprises an actual fingerprint recognition step of checking whether colors of the finger image photographed by the smartphone are all matched to determine whether it is an actual fingerprint.

* * * * *